United States Patent
Wang

(10) Patent No.: US 8,764,615 B2
(45) Date of Patent: Jul. 1, 2014

(54) MODULARIZED ELECTROMAGNETIC RESISTANCE APPARATUS

(75) Inventor: Shih-Jung Wang, Taiping (TW)

(73) Assignee: Preventative Medical Health Care Co., Ltd, Guishan Township (TW)

( * ) Notice: Subject to any disclaimer, the term of this patent is extended or adjusted under 35 U.S.C. 154(b) by 506 days.

(21) Appl. No.: 13/171,654

(22) Filed: Jun. 29, 2011

(65) Prior Publication Data

US 2013/0002073 A1 Jan. 3, 2013

(51) Int. Cl.
*A63B 22/00* (2006.01)
*A63B 69/06* (2006.01)

(52) U.S. Cl.
USPC .................................... 482/51; 482/1; 482/63

(58) Field of Classification Search
USPC ............ 482/1–8, 51, 57, 63; 188/164; 310/74
See application file for complete search history.

(56) References Cited

U.S. PATENT DOCUMENTS

| | | | | |
|---|---|---|---|---|
| 2,595,755 A * | 5/1952 | Bedford, Jr. | .................. | 335/255 |
| 3,019,876 A * | 2/1962 | Rabinow | ...................... | 192/84.3 |
| 4,713,567 A * | 12/1987 | Fey et al. | ...................... | 310/105 |
| 5,072,930 A * | 12/1991 | Sun | .................................... | 482/5 |
| 5,236,069 A * | 8/1993 | Peng | .............................. | 188/267 |
| 5,254,061 A * | 10/1993 | Leask | .............................. | 482/63 |
| 6,084,325 A * | 7/2000 | Hsu | .................................. | 310/74 |
| 6,273,845 B1* | 8/2001 | Liou | .............................. | 482/63 |
| 6,318,517 B1* | 11/2001 | Chang | .......................... | 188/161 |
| 6,373,161 B1* | 4/2002 | Khalaf | ..................... | 310/154.02 |
| 6,459,184 B1* | 10/2002 | Ozeki | .............................. | 310/93 |
| 6,581,731 B2* | 6/2003 | Chen | .............................. | 188/164 |
| 6,945,917 B1* | 9/2005 | Baatz | .............................. | 482/63 |
| 8,026,647 B2* | 9/2011 | Seo | .................................. | 310/105 |
| 2008/0207402 A1* | 8/2008 | Fisher et al. | ........................ | 482/5 |
| 2009/0118099 A1* | 5/2009 | Fisher et al. | ........................ | 482/5 |

* cited by examiner

*Primary Examiner* — Stephen Crow
(74) *Attorney, Agent, or Firm* — Alan Kamrath; Kamrath IP Lawfirm, P.A.

(57) ABSTRACT

An electromagnetic resistance apparatus includes a support frame, a metallic conductive plate rotatably mounted on the support frame, and at least one magnetically controlled mechanism mounted on the support frame and aligning with the metallic conductive plate. Thus, the electromagnetic resistance apparatus has a modularized structure so that the electromagnetic resistance apparatus is mounted on a rehabilitation or exercising equipment easily and quickly so as to shorten the time and save the cost of assembly of the electromagnetic resistance apparatus.

19 Claims, 11 Drawing Sheets

MODULARIZED ELECTROMAGNETIC RESISTANCE APPARATUS

BACKGROUND OF THE INVENTION

1. Field of the Invention

The present invention relates to a damping system and, more particularly, to an electromagnetic resistance apparatus for a rehabilitation or exercising equipment.

2. Description of the Related Art

A conventional electromagnetic resistance apparatus comprises a fixing frame mounted on a rehabilitation or exercising equipment, an inertia wheel pivotally mounted on the fixing frame, a magnetically controlled braking ring secured on a periphery of the inertia wheel, and a magnetic body secured on the fixing frame and aligning with the inertia wheel. The magnetic body includes a magnetic circuit which having at least two poles, and a plurality of coils wound around each of the poles of the magnetic circuit. Thus, when the coils are energized, the magnetic body produces a magnetic force to provide a resistance to damp rotation of the inertia wheel so that the user has to apply a larger force on the inertia wheel so as to overcome the damping force or resistance applied by the magnetic body, thereby enhancing the exercising or rehabilitating effect. The rehabilitation or exercising equipment has a controller to control the voltage, current and output magnetic power of the coils so as to control the magnetic flux in the magnetic circuit so that the damping force or resistance can be regulated properly. However, the coils are limited to the profile of the magnetic body so that the coils are initially extended into a gap of the magnetic body slowly and are then in turn wound around the magnetic body. Thus, it takes a longer time to assemble the magnetic body and the coils, thereby causing inconvenience and wasting time in assembly of the electromagnetic resistance apparatus.

BRIEF SUMMARY OF THE INVENTION

In accordance with the present invention, there is provided an electromagnetic resistance apparatus, comprising a support frame, a metallic conductive plate rotatably mounted on the support frame, and at least one magnetically controlled mechanism mounted on the support frame and aligning with the metallic conductive plate.

The primary objective of the present invention is to provide an electromagnetic resistance apparatus with a modularized structure.

According to the primary advantage of the present invention, the electromagnetic resistance apparatus has a modularized structure so that the electromagnetic resistance apparatus is mounted on a rehabilitation or exercising equipment easily and quickly so as to shorten the time and save the cost of assembly of the electromagnetic resistance apparatus.

According to another advantage of the present invention, the electromagnetic resistance apparatus can provide a larger damping force to the rehabilitation or exercising equipment, thereby greatly enhancing the exercising or rehabilitating effect.

Further benefits and advantages of the present invention will become apparent after a careful reading of the detailed description with appropriate reference to the accompanying drawings.

BRIEF DESCRIPTION OF THE SEVERAL VIEWS OF THE DRAWING(S)

DETAILED DESCRIPTION OF THE INVENTION

Figure 1:
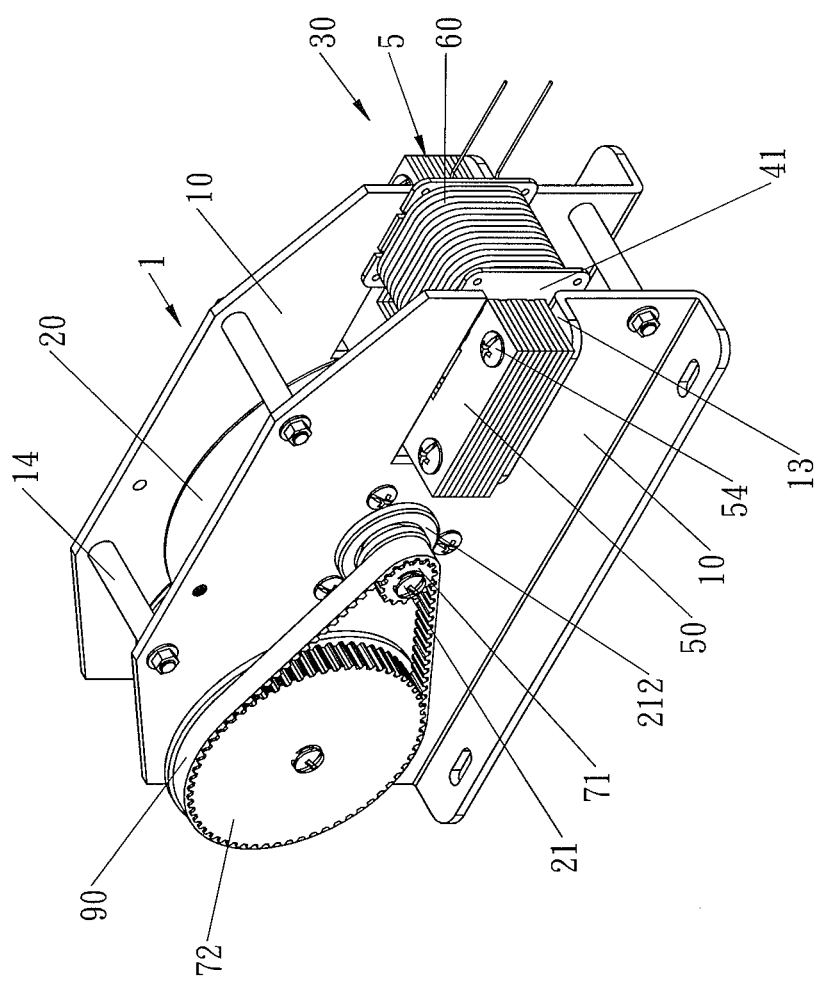
FIG. 1 is a perspective view of an electromagnetic resistance apparatus in accordance with the preferred embodiment of the present invention.
Figure 2:
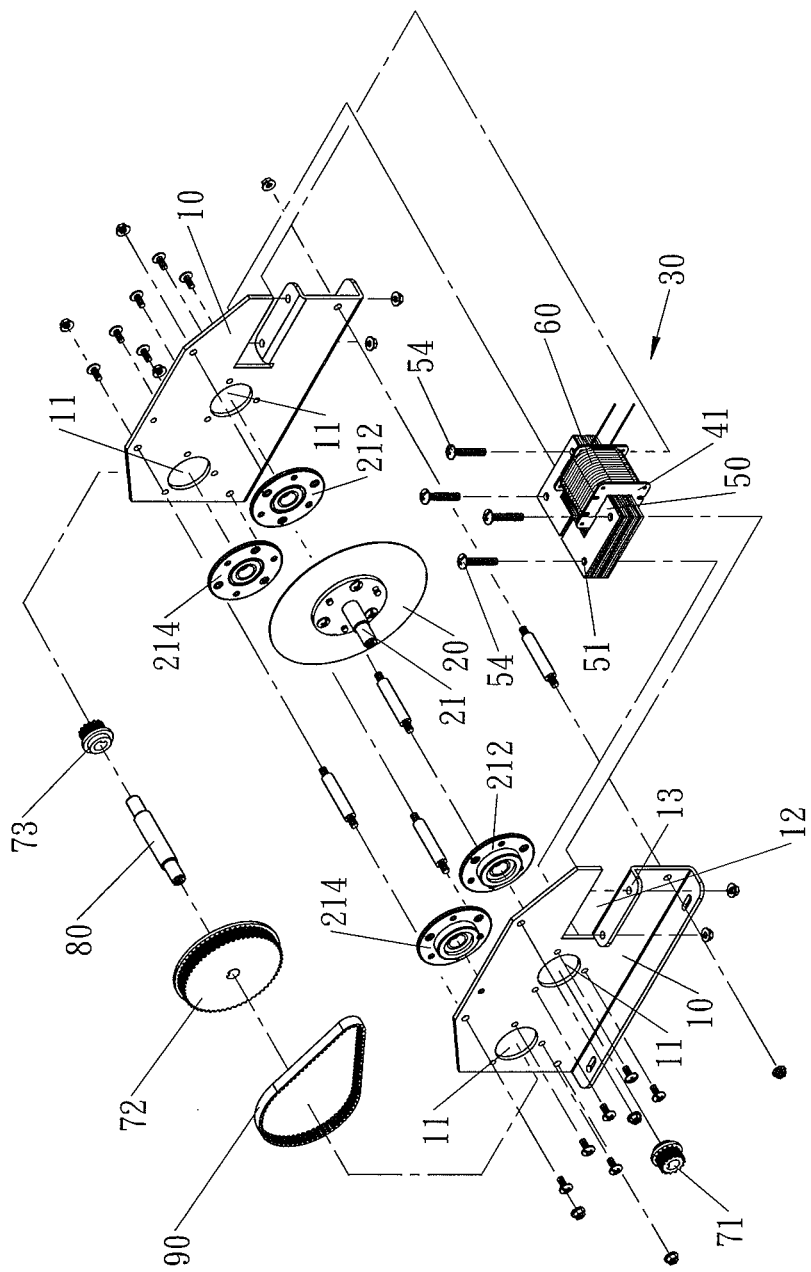
FIG. 2 is an exploded perspective view of the electromagnetic resistance apparatus as shown in FIG. 1.
Figure 3:
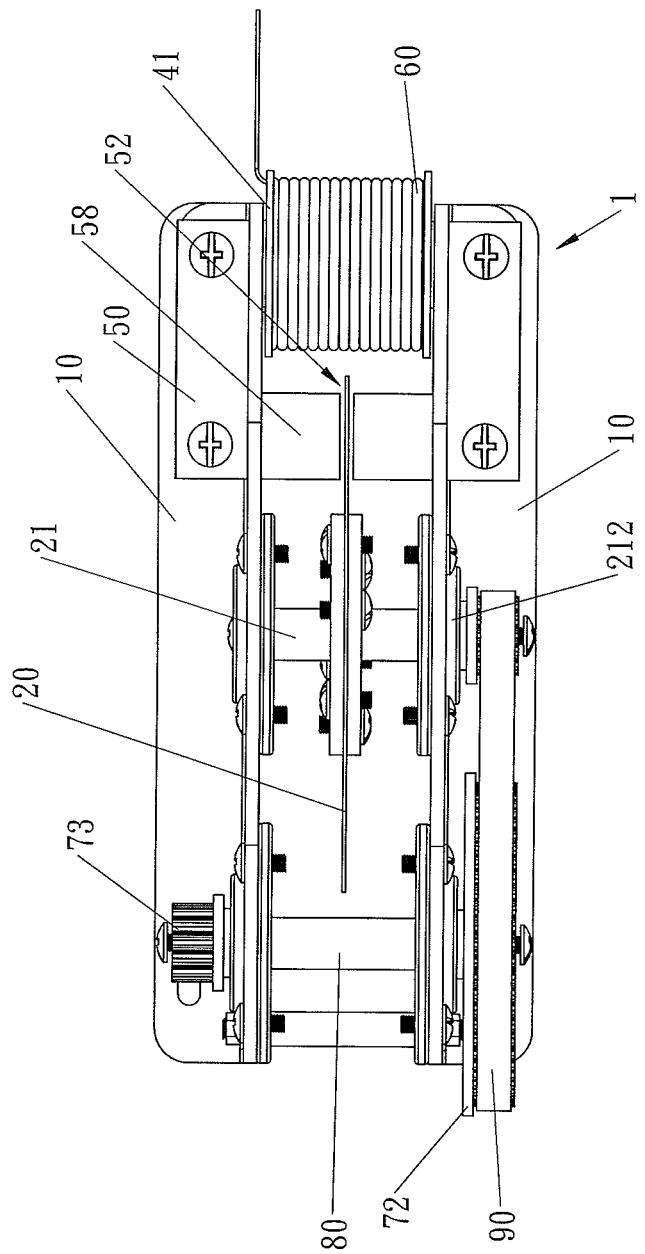
FIG. 3 is a top view of the electromagnetic resistance apparatus as shown in FIG. 1.
Figure 4:
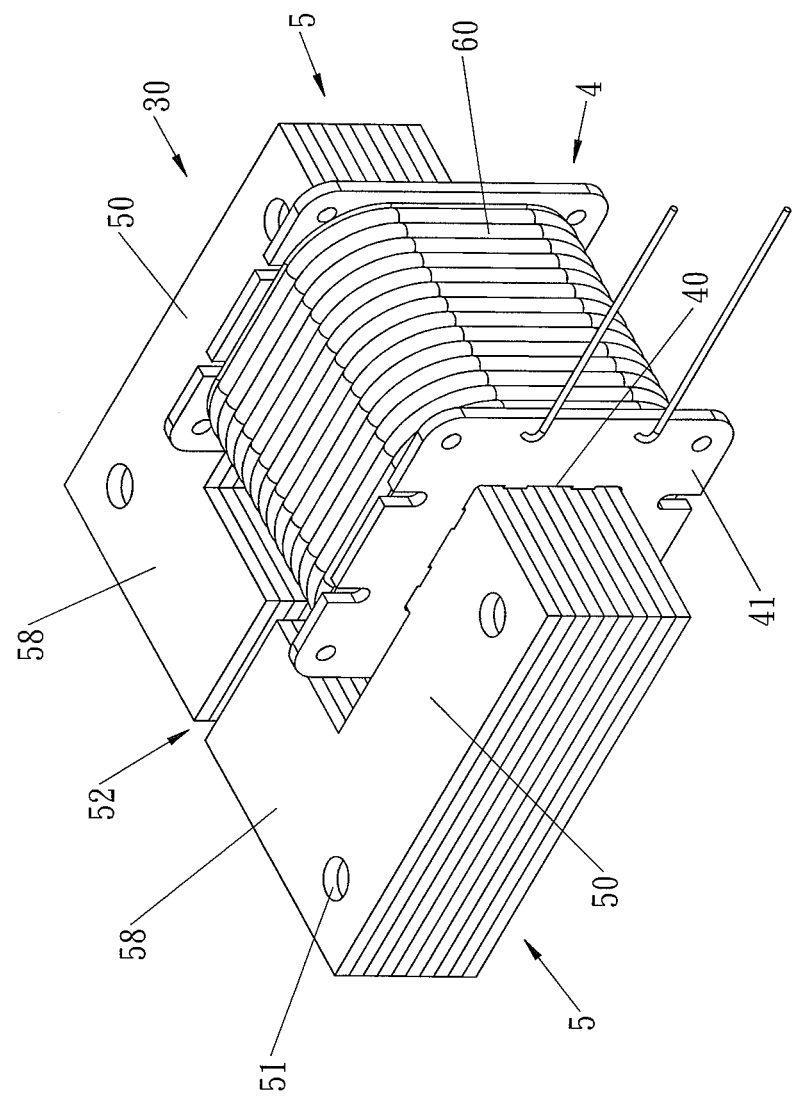
FIG. 4 is a perspective view of a magnetically controlled mechanism of the electromagnetic resistance apparatus as shown in FIG. 1.
Figure 5:
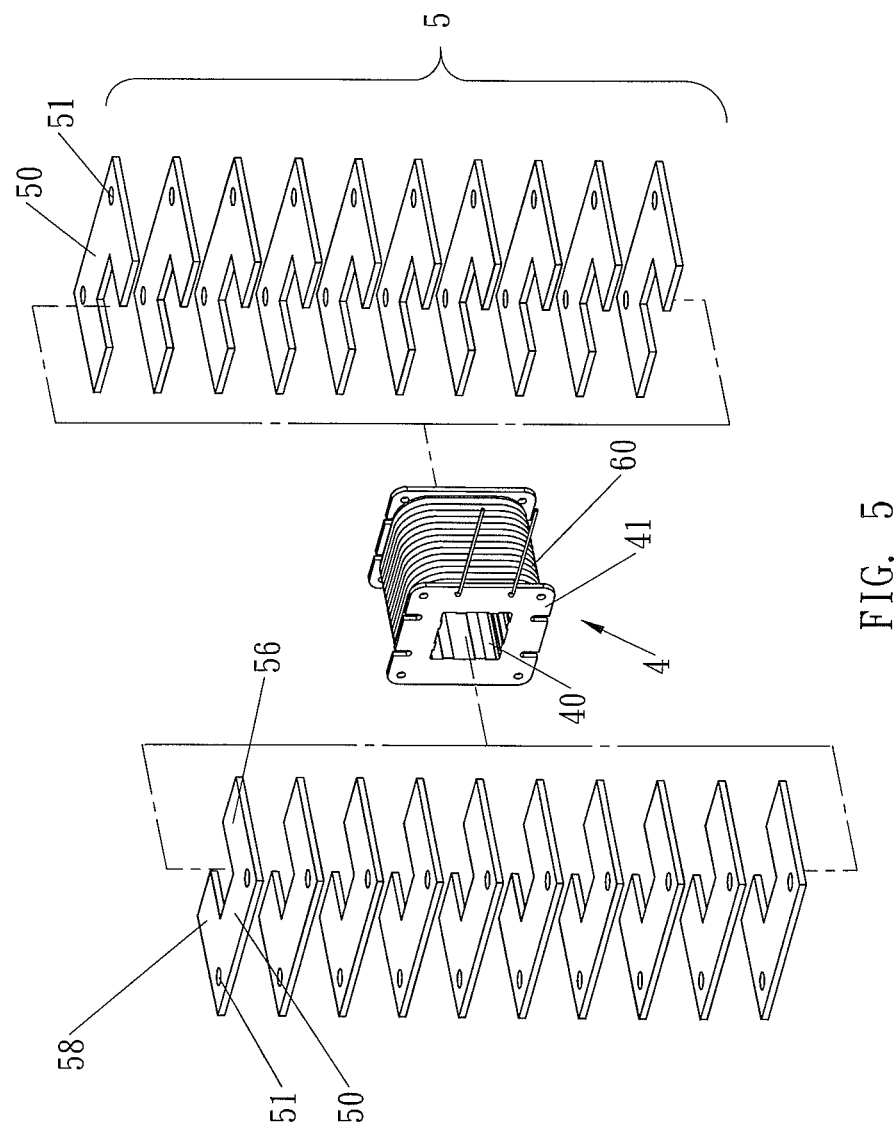
FIG. 5 is an exploded perspective view of the magnetically controlled mechanism of the electromagnetic resistance apparatus as shown in FIG. 4.
Figure 6:
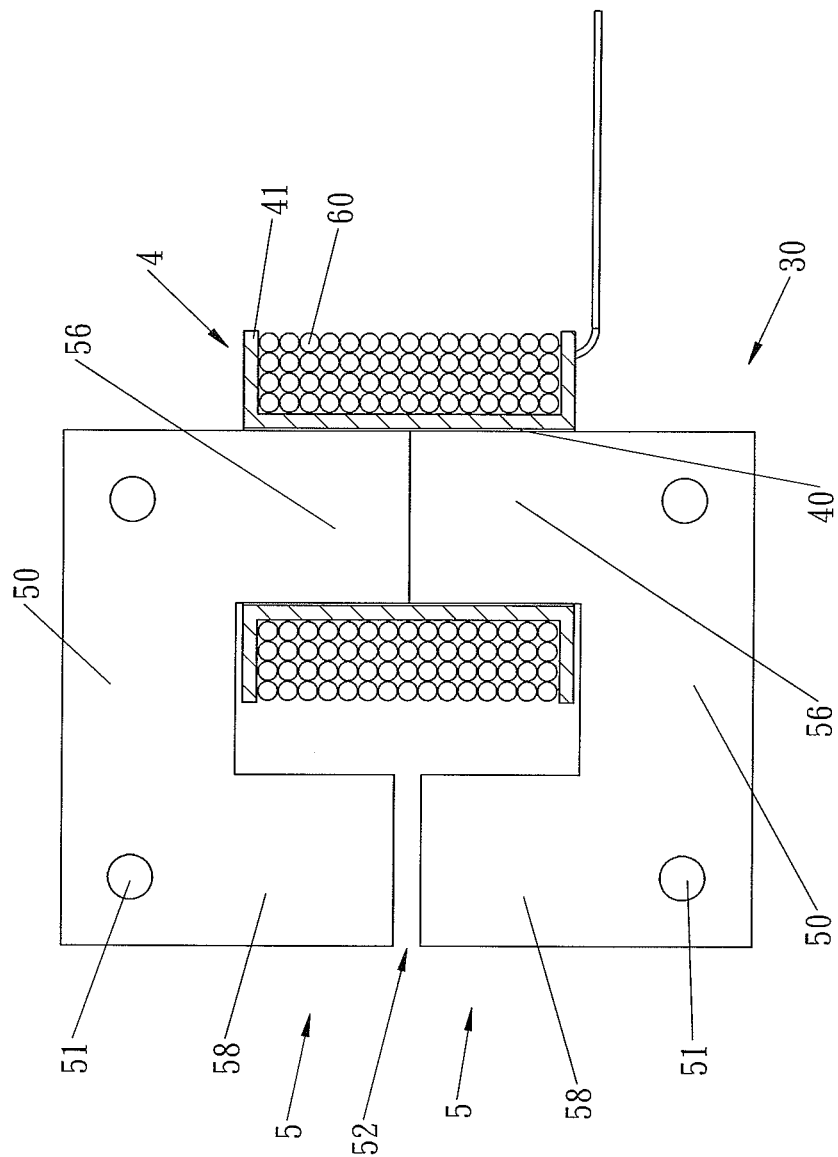
FIG. 6 is a top cross-sectional view of the magnetically controlled mechanism of the electromagnetic resistance apparatus as shown in FIG. 4.

Referring to the drawings and initially to FIGS. 1-6, an electromagnetic resistance apparatus in accordance with the preferred embodiment of the present invention comprises a support frame 1, a metallic conductive plate 20 rotatably mounted on the support frame 1, and at least one magnetically controlled mechanism 30 mounted on the support frame 1 and aligning with the metallic conductive plate 20.

The support frame 1 includes two support brackets 10 spaced from each other. The two support brackets 10 of the support frame 1 are connected by a plurality of spacers 14. Alternatively, the two support brackets 10 of the support frame 1 are formed integrally. Each of the two support brackets 10 of the support frame 1 has a substantially L-shaped profile. Each of the two support brackets 10 of the support frame 1 has a surface provided with a plurality of mounting holes 11 and has a side provided with at least one receiving slot 12 to receive the magnetically controlled mechanism 30. The receiving slot 12 of each of the two support brackets 10 has a bottom wall provided with a support rib 13 to support the magnetically controlled mechanism 30.

The magnetically controlled mechanism 30 is located between the two support brackets 10 of the support frame 1 and is received in the receiving slot 12 of each of the two support brackets 10. The magnetically controlled mechanism 30 has two opposite sides each secured on and supported by the support rib 13 of each of the two support brackets 10.

The magnetically controlled mechanism 30 includes a spool 4, a coil 60 wound around the spool 4, two magnetic units 5 connected with the spool 4, and a clearance 52 defined between the two magnetic units 5 and aligning with the coil 60.

The spool 4 of the magnetically controlled mechanism 30 is made of a plastic material. The spool 4 of the magnetically controlled mechanism 30 has an interior provided with a receiving chamber 40. The spool 4 of the magnetically controlled mechanism 30 has a peripheral wall provided with two opposite stop flanges 41. The coil 60 of the magnetically controlled mechanism 30 is limited between the two stop flanges 41 of the spool 4.

Each of the two magnetic units 5 of the magnetically controlled mechanism 30 has a substantially U-shaped profile. Each of the two magnetic units 5 of the magnetically controlled mechanism 30 has a first end 56 inserted into the receiving chamber 40 of the spool 4 and a second end 58 located outside of the spool 4. The first ends 56 of the two magnetic units 5 are juxtaposed to each other. The second ends 58 of the two magnetic units 5 are spaced from and faces each other, and the clearance 52 of the magnetically controlled mechanism 30 is defined between the second ends 58 of the two magnetic units 5.

Each of the two magnetic units 5 of the magnetically controlled mechanism 30 includes a plurality of magnetic plates 50 laminating each other. Each of the magnetic plates 50 of each of the two magnetic units 5 is made of silicon steel and has a surface provided with a plurality of fixing holes 51. The magnetic plates 50 of each of the two magnetic units 5 are combined together by a plurality of fastening members 54 which are extended through the fixing holes 51 of each of the magnetic plates 50.

The metallic conductive plate 20 is made of a material without magnetic conductivity. Preferably, the metallic conductive plate 20 is made of aluminum or copper. The metallic conductive plate 20 is disposed between the two support brackets 10 of the support frame 1 and is extended into the magnetically controlled mechanism 30. The metallic conductive plate 20 is extended through the clearance 52 of the magnetically controlled mechanism 30 and is aligned with the coil 60 of the magnetically controlled mechanism 30. The metallic conductive plate 20 has a circular shape and has a central portion provided with a mandrel 21. The mandrel 21 is rotatably mounted on the support frame 1 and is located between the two support brackets 10 of the support frame 1 by two bearing seats 212. Each of the two bearing seats 212 is mounted in one of the mounting holes 11 of each of the two support brackets 10.

The electromagnetic resistance apparatus further comprises a first geared member 71 secured on the mandrel 21 to rotate in concert with the mandrel 21, a rotation shaft 80 rotatably mounted on the support frame 1, a second geared member 72 secured on a first end of the rotation shaft 80 to rotate in concert with the rotation shaft 80, a third geared member 73 secured on a first end of the rotation shaft 80 to rotate in concert with the rotation shaft 80, and a toothed belt 90 mounted between and meshing with the first geared member 71 and the second geared member 72 so that the first geared member 71 and the second geared member 72 are rotated in concert with each other.

The second geared member 72 has a diameter greater than that of the first geared member 71. The rotation shaft 80 is located between the two support brackets 10 of the support frame 1 by two bearing seats 214. Each of the two bearing seats 214 is mounted in one of the mounting holes 11 of each of the two support brackets 10.

In operation, when the third geared member 73 is rotated, the rotation shaft 80 is rotated by the third geared member 73 to rotate the second geared member 72 which rotates the toothed belt 90 which rotates the first geared member 71 which rotates the mandrel 21 which rotates the metallic conductive plate 20 so that the metallic conductive plate 20 is rotated in the clearance 52 of the magnetically controlled mechanism 30. When the magnetically controlled mechanism 30 is energized, the coil 60 and the two magnetic units 5 of the magnetically controlled mechanism 30 cause an electromagnetic effect. In such a manner, the magnetic path of the two magnetic units 5 passes through the metallic conductive plate 20 so that the magnetic force produced by the coil 60 will pass through the two magnetic units 5 and the metallic conductive plate 20. Thus, the magnetic force produced by the coil 60 will form an eddy current to produce a resistance to the metallic conductive plate 20, and will produce a reaction moment to apply a reverse torque on the metallic conductive plate 20 so as to provide an electromagnetic resistance to damp rotation of the metallic conductive plate 20. At this time, the electromagnetic resistance applied on the metallic conductive plate 20 is controlled by the magnetically controlled mechanism 30.

Figure 7:
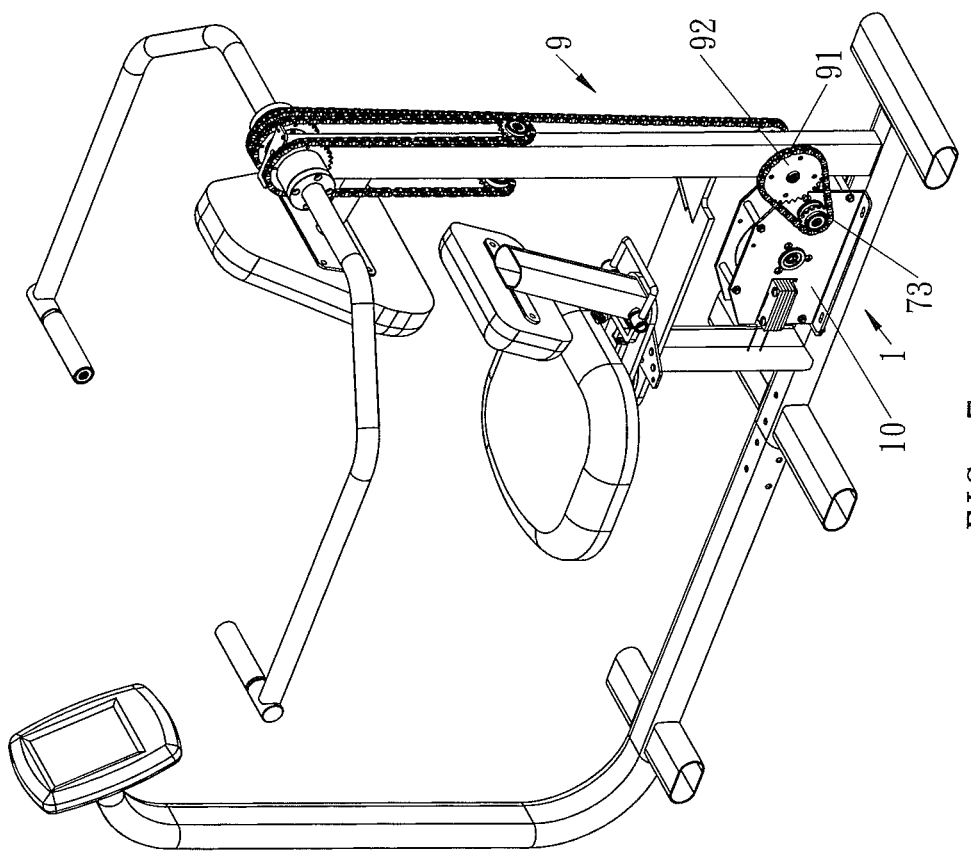
FIG. 7 is a perspective view of the electromagnetic resistance apparatus for a rehabilitation or exercising equipment as shown in FIG. 1.

Referring to FIG. 7 with reference to FIGS. 1-6, the electromagnetic resistance apparatus is mounted on a rehabilitation or exercising equipment 9 which includes a drive geared member 92 and a transmission chain 91 mounted between and meshing with the drive geared member 92 and the third geared member 73 of the electromagnetic resistance apparatus. When the drive geared member 92 is driven by a user, the drive geared member 92 is rotated to rotate the transmission chain 91 which rotates the third geared member 73 so as drive and rotate the metallic conductive plate 20. Thus, the magnetically controlled mechanism 30 is energized to provide an electromagnetic resistance so as to damp rotation of the metallic conductive plate 20 so that the user has to apply a larger force on the drive geared member 92 so as to overcome the damping force applied by the electromagnetic resistance apparatus, thereby enhancing the exercising or rehabilitating effect.

Figure 8:
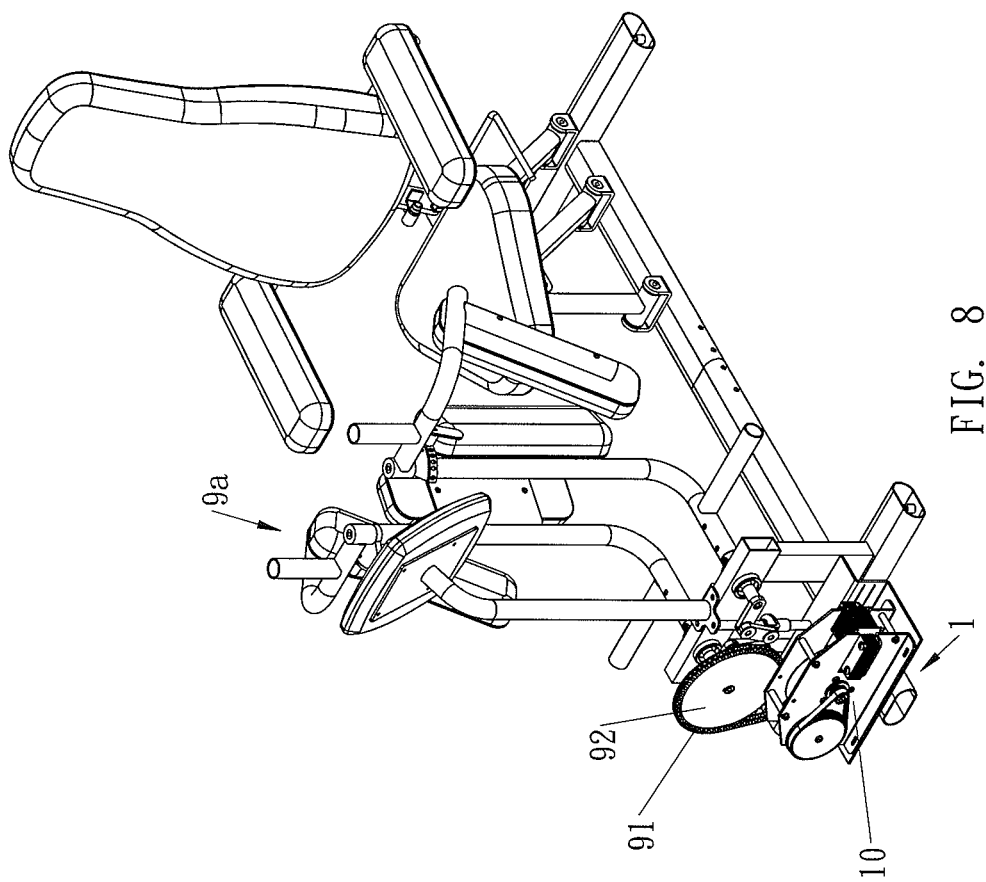
FIG. 8 is a perspective view of the electromagnetic resistance apparatus for another rehabilitation or exercising equipment as shown in FIG. 1.

Referring to FIG. 8 with reference to FIGS. 1-6, the electromagnetic resistance apparatus is mounted on another rehabilitation or exercising equipment 9a.

Figure 9:
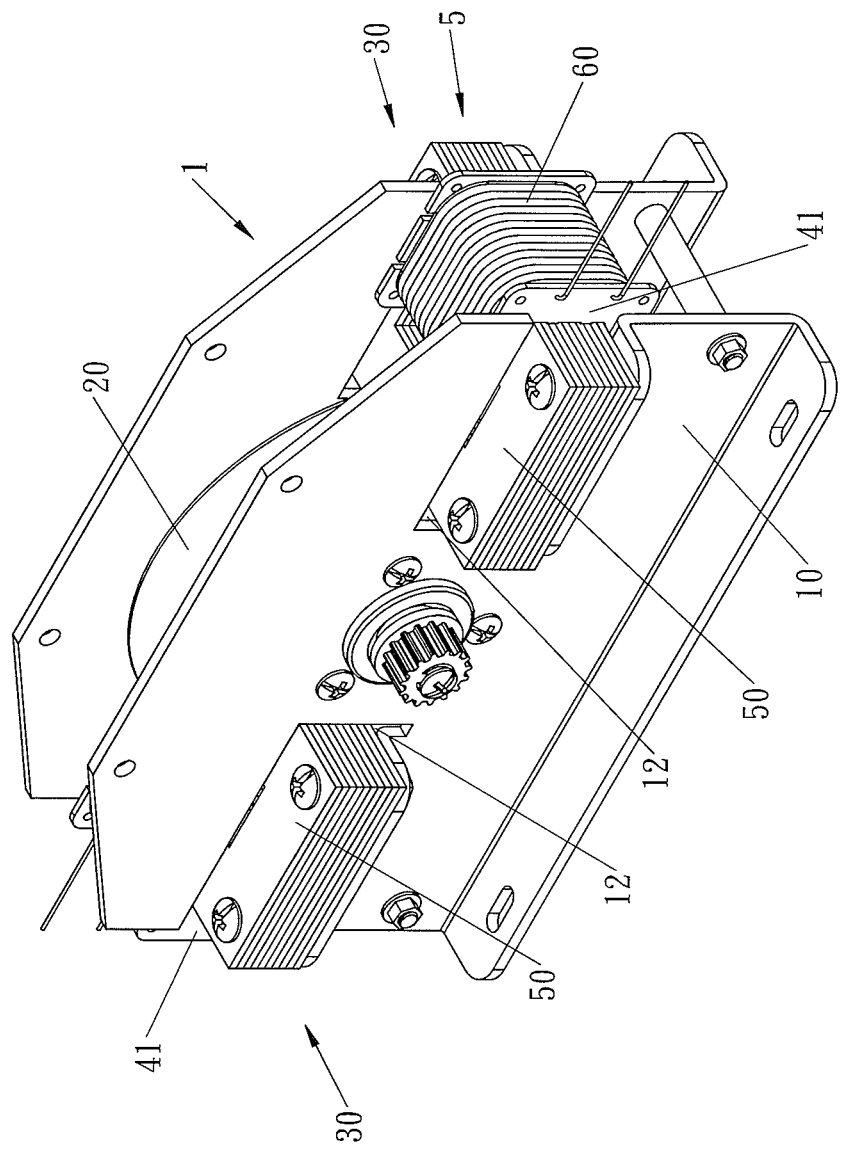
FIG. 9 is a perspective view of an electromagnetic resistance apparatus in accordance with another preferred embodiment of the present invention.
Figure 10:
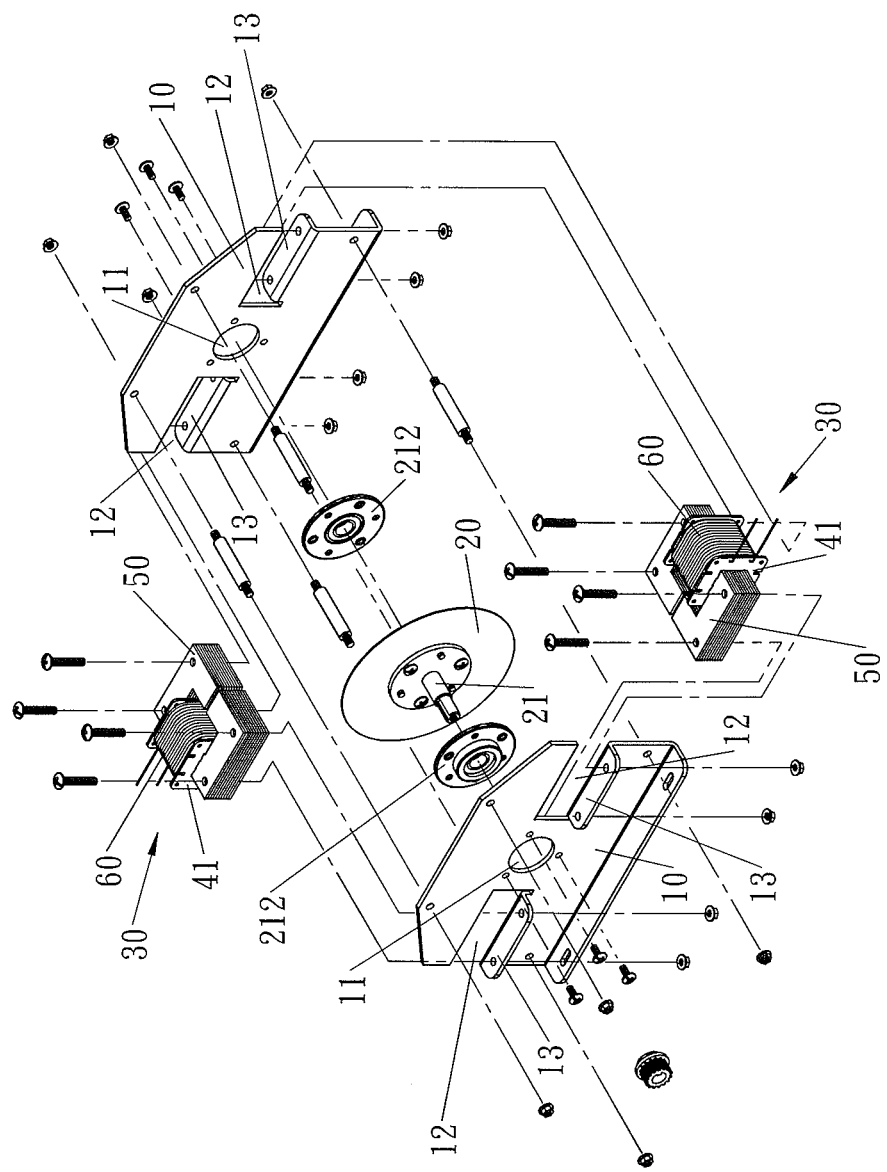
FIG. 10 is an exploded perspective view of the electromagnetic resistance apparatus as shown in FIG. 9.
Figure 11:
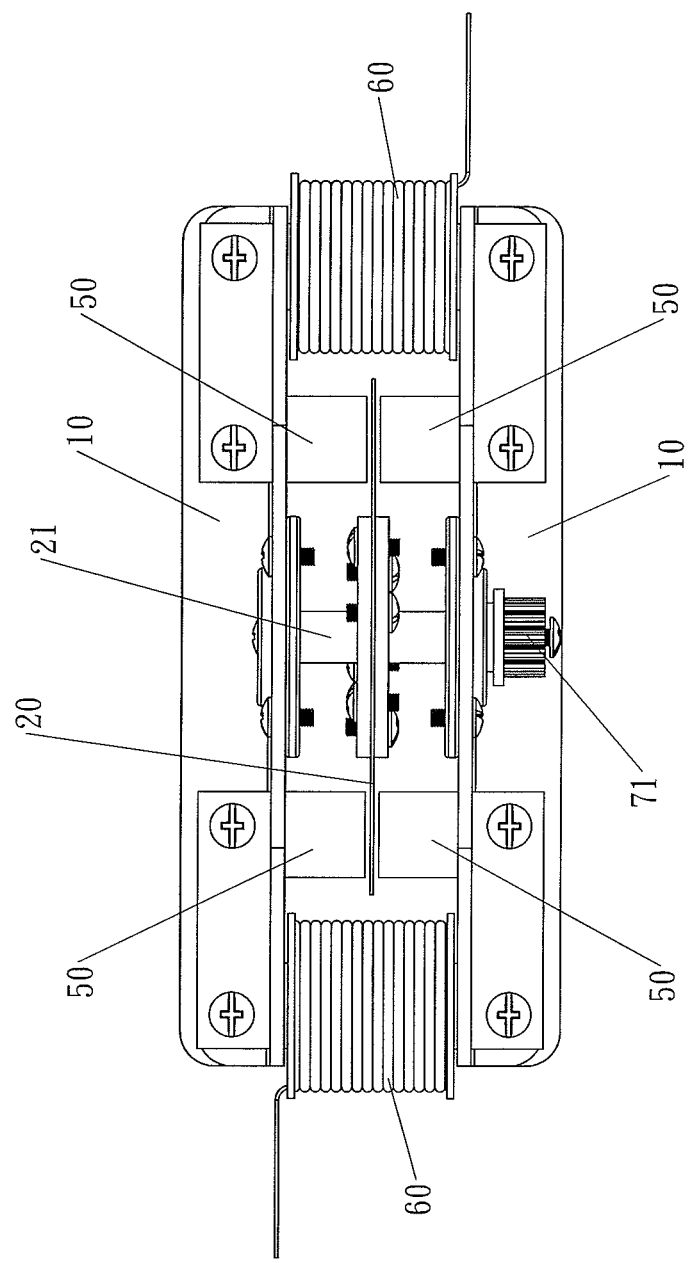
FIG. 11 is a top view of the electromagnetic resistance apparatus as shown in FIG. 9.

Referring to FIGS. 9-11, the electromagnetic resistance apparatus comprises two magnetically controlled mechanisms 30 each mounted on the support frame 1 and each aligning with the metallic conductive plate 20. The two magnetically controlled mechanisms 30 are spaced from each other, and the metallic conductive plate 20 is disposed between and extended into the two magnetically controlled mechanisms 30. Each of the two support brackets 10 of the support frame 1 has a side provided with two receiving slots 12 to receive the two magnetically controlled mechanisms 30 respectively. Each of the two receiving slots 12 of each of the two support brackets 10 has a bottom wall provided with a support rib 13 to support the respective magnetically controlled mechanism 30. Thus, the two magnetically controlled mechanisms 30 provide a larger resistance to damp rotation of the metallic conductive plate 20, thereby enhancing the exercising or rehabilitating effect.

Accordingly, the electromagnetic resistance apparatus has a modularized structure so that the electromagnetic resistance apparatus is mounted on a rehabilitation or exercising equipment easily and quickly so as to shorten the time and save the cost of assembly of the electromagnetic resistance apparatus. In addition, the electromagnetic resistance apparatus can provide a larger damping force to the rehabilitation or exercising equipment, thereby greatly enhancing the exercising or rehabilitating effect.

Although the invention has been explained in relation to its preferred embodiment(s) as mentioned above, it is to be understood that many other possible modifications and variations can be made without departing from the scope of the present invention. It is, therefore, contemplated that the appended claim or claims will cover such modifications and variations that fall within the true scope of the invention.

The invention claimed is:

1. An electromagnetic resistance apparatus comprising:
a support frame;
a metallic conductive plate rotatable mounted on the support frame; and
at least one magnetically controlled mechanism mounted on the support frame and aligning with the metallic conductive plate, wherein:
the support frame includes two support brackets spaced from each other;
the electromagnetic resistance apparatus comprises two magnetically controlled mechanisms each mounted on the support frame and each aligning with the metallic conductive plate;
the two magnetically controlled mechanisms are spaced from each other;
the metallic conductive plate is disposed between and extended into the two magnetically controlled mechanisms; and
each of the two support brackets of the support frame has a side provided with two receiving slots to receive the two magnetically controlled mechanisms respectively.

2. The electromagnetic resistance apparatus of claim 1, wherein each of the two receiving slots of each of the two support brackets has a bottom wall provided with a support rib to support the respective magnetically controlled mechanism.

3. The electromagnetic resistance apparatus of claim 1, wherein:
the metallic conductive plate is made of a material without magnetic conductivity;
the metallic conductive plate is made of aluminum or copper; and
the metallic conductive plate has a circular shape.

4. The electromagnetic resistance apparatus of claim 1, wherein:
the support frame includes two support brackets spaced from each other;
the magnetically controlled mechanism is located between the two support brackets of the support frame; and
the metallic conductive plate is disposed between the two support brackets of the support frame and is extended into the magnetically controlled mechanism.

5. The electromagnetic resistance apparatus of claim 4, wherein:
each of the two support brackets of the support frame has a side provided with at least one receiving slot to receive the magnetically controlled mechanism; and
the magnetically controlled mechanism is received in the receiving slot of each of the two support brackets.

6. The electromagnetic resistance apparatus of claim 5, wherein:
the receiving slot of each of the two support brackets has a bottom wall provided with a support rib to support the magnetically controlled mechanism; and
the magnetically controlled mechanism has two opposite sides each secured on and supported by the support rib of each of the two support brackets.

7. The electromagnetic resistance apparatus of claim 4, wherein:
each of the two support brackets of the support frame has a surface provided with a plurality of mounting holes;
the metallic conductive plate has a central portion provided with a mandrel;
the mandrel is rotatably mounted on the support frame and is located between the two support brackets of the support frame by two bearing seats; and
each of the two bearing seats is mounted in one of the mounting holes of each of the two support brackets.

8. The electromagnetic resistance apparatus of claim 4, wherein the spool of the magnetically controlled mechanism is made of a plastic material.

9. An electromagnetic resistance apparatus comprising:
a support frame;
a metallic conductive plate rotatably mounted on the support frame;
at least one magnetically controlled mechanism mounted on the support frame and aligning with the metallic conductive plate, wherein:
the support frame includes two support brackets spaced from each other;
the magnetically controlled mechanism is located between the two support brackets of the support frame;
the metallic conductive plate is disposed between the two support brackets of the support frame and is extended into the magnetically controlled mechanism;
each of the two support brackets of the support frame has a surface provided with a plurality of mounting holes;
the metallic conductive plate has a central portion provided with a mandrel;
the mandrel is rotatably mounted on the support frame and is located between the two support brackets of the support frame by two bearing seats; and
each of the two bearing seats is mounted in one of the mounting holes of each of the two support brackets;
a first geared member secured on the mandrel to rotate in concert with the mandrel;
a rotation shaft rotatably mounted on the support frame;
a second geared member secured on a first end of the rotation shaft to rotate in concert with the rotation shaft;
a third geared member secured on a first end of the rotation shaft to rotate in concert with the rotation shaft; and
a toothed belt mounted between and meshing with the first geared member and the second geared member so that the first geared member and the second geared member are rotated in concert with each other.

10. The electromagnetic resistance apparatus of claim 9, wherein:
the rotation shaft is located between the two support brackets of the support frame by two bearing seats; and
each of the two bearing seats is mounted in one of the mounting holes of each of the two support brackets.

11. The electromagnetic resistance apparatus of claim 9, wherein the second geared member has a diameter greater than that of the first geared member.

12. The electromagnetic resistance apparatus of claim 9, wherein:
the magnetically controlled mechanism includes:
a spool;
a coil wound around the spool;
two magnetic units connected with the spool; and
a clearance defined between the two magnetic units and aligning with the coil; and
the metallic conductive plate is extended through the clearance of the magnetically controlled mechanism and is aligned with the coil of the magnetically controlled mechanism.

13. The electromagnetic resistance apparatus of claim 12, wherein:
the spool of the magnetically controlled mechanism has an interior provided with a receiving chamber;

each of the two magnetic units of the magnetically controlled mechanism has a first end inserted into the receiving chamber of the spool and a second end located outside of the spool;

the second ends of the two magnetic units are spaced from and faces each other; and the clearance of the magnetically controlled mechanism is defined between the second ends of the two magnetic units.

14. The electromagnetic resistance apparatus of claim 13, wherein each of the two magnetic units of the magnetically controlled mechanism has a substantially U-shaped profile.

15. The electromagnetic resistance apparatus of claim 13, wherein the first ends of the two magnetic units are juxtaposed to each other.

16. The electromagnetic resistance apparatus of claim 12, wherein each of the two magnetic units of the magnetically controlled mechanism includes a plurality of magnetic plates laminating each other.

17. The electromagnetic resistance apparatus of claim 16, wherein:

each of the magnetic plates of each of the two magnetic units has a surface provided with a plurality of fixing holes; and the magnetic plates of each of the two magnetic units are combined together by a plurality of fastening members which are extended through the fixing holes of each of the magnetic plates.

18. The electromagnetic resistance apparatus of claim 12, wherein:

the spool of the magnetically controlled mechanism has a peripheral wall provided with two opposite stop flanges; and the coil of the magnetically controlled mechanism is limited between the two stop flanges of the spool.

19. The electromagnetic resistance apparatus of claim 9, wherein each of the magnetic plates of each of the two magnetic units is made of silicon steel.

* * * * *